United States Patent [19]

Yamamuro

[11] Patent Number: 5,761,189
[45] Date of Patent: Jun. 2, 1998

[54] APPARATUS FOR MANUFACTURING A MASER DISK, OPTICAL DISK FORMING APPARATUS, AND OPTICAL DISK FORMING METHOD

[75] Inventor: Mikio Yamamuro, Yokohama, Japan

[73] Assignee: Kabushiki Kaisha Toshiba, Kawasaki, Japan

[21] Appl. No.: 629,529

[22] Filed: Apr. 9, 1996

[30] Foreign Application Priority Data

Aug. 10, 1995 [JP] Japan .................... 7-204427

[51] Int. Cl.$^6$ ............................ G11B 7/00
[52] U.S. Cl. .................. 369/275.3; 369/275.4; 369/58
[58] Field of Search ............ 369/275.3, 275.4, 369/275.1, 272, 277, 47, 54, 58

[56] References Cited

U.S. PATENT DOCUMENTS 4,989,195  1/1991  Suzuki ................ 369/50
5,508,995  4/1996  Moriya et al. ........ 369/275.4

FOREIGN PATENT DOCUMENTS

| 0 469 727 A1 | 2/1992 | European Pat. Off. |
| 0 570 235 A2 | 11/1993 | European Pat. Off. |
| 0 588 305 A2 | 3/1994 | European Pat. Off. |
| 0 768 648 A1 | 4/1997 | European Pat. Off. |

Primary Examiner—Muhammad N. Edun
Attorney, Agent, or Firm—Cushman Darby & Cushman IP Group of Pillsbury Madison & Sutro LLP

[57] ABSTRACT

In this invention, disk ID data associated with the characteristics of optical disks are recorded on the innermost peripheral portions of a rewritable optical disk and a read only optical disk in advance. The invention can handle both a rewritable optical disk on/from which data is recorded/reproduced by using both a groove and a land, and a read only optical disk on which data is recorded by recording record marks in a mastering process, and can correctly and quickly identify each optical disk.

8 Claims, 9 Drawing Sheets

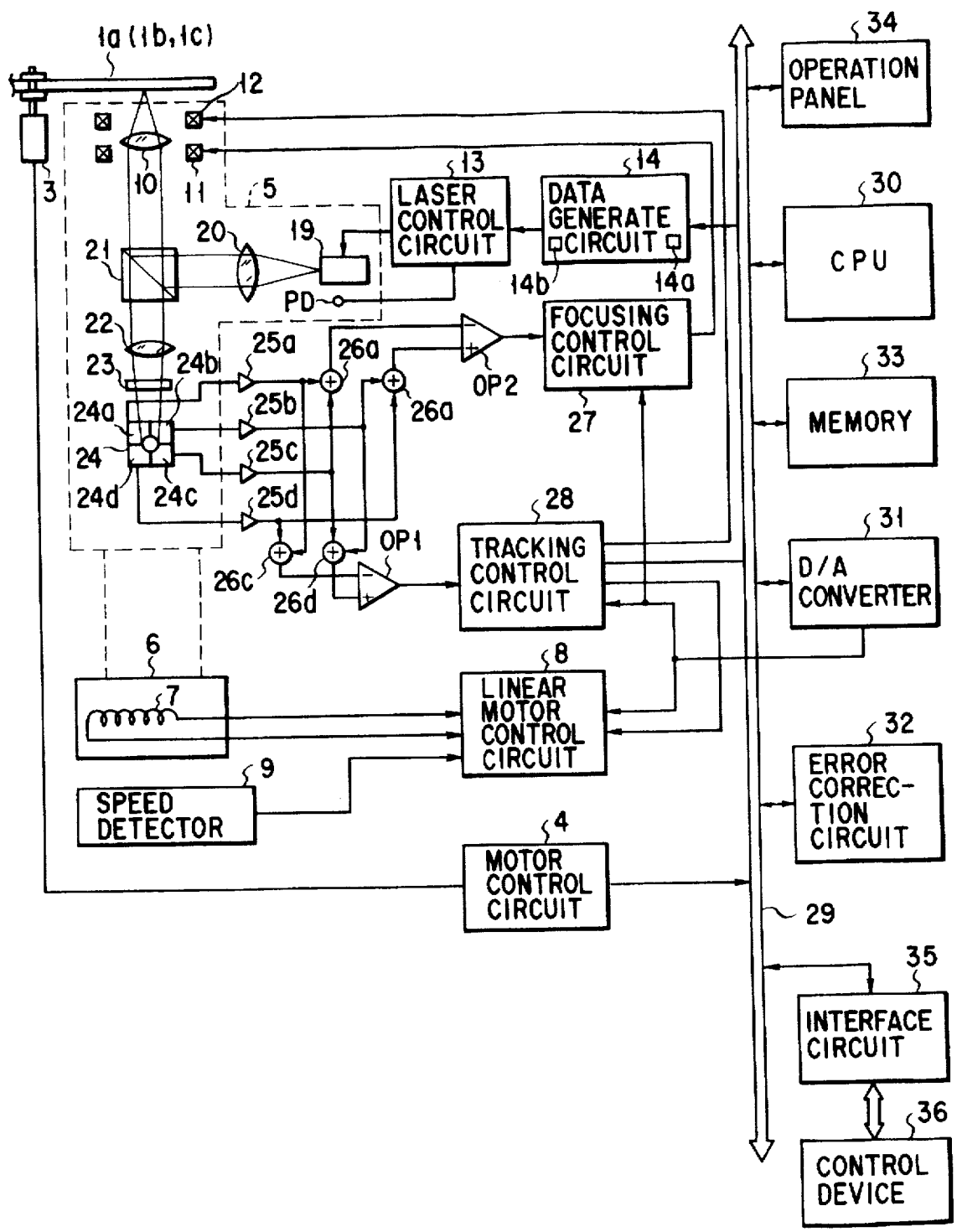
F I G. 1

| | 2BYTES | 91BYTES | 2BYTES | 91BYTES | | | |
|---|---|---|---|---|---|---|---|
| | SYNCH. CODE | SECTOR 1 (1/2) | SYNCH. CODE | SECTOR 1 (2/2) | } | 12ROWS | |
| | SYNCH. CODE | 1/16 ECC2 | SYNCH. CODE | 1/16 ECC2 | } | 1ROW | |
| | SYNCH. CODE | SECTOR 2 (1/2) | SYNCH. CODE | SECTOR 2 (2/2) | } | 12ROWS | |
| | SYNCH. CODE | 2/16 ECC2 | SYNCH. CODE | 2/16 ECC2 | } | 1ROW | |
| | --- | --- | --- | --- | | | |
| | SYNCH. CODE | SECTOR 16 (1/2) | SYNCH. CODE | SECTOR 16 (1/2) | } | 12ROWS | |
| | SYNCH. CODE | 16/16 ECC2 | SYNCH. CODE | 16/16 ECC2 | } | 1ROW | |

[0100000000000000 0100XXXXXX00100]

F I G. 3

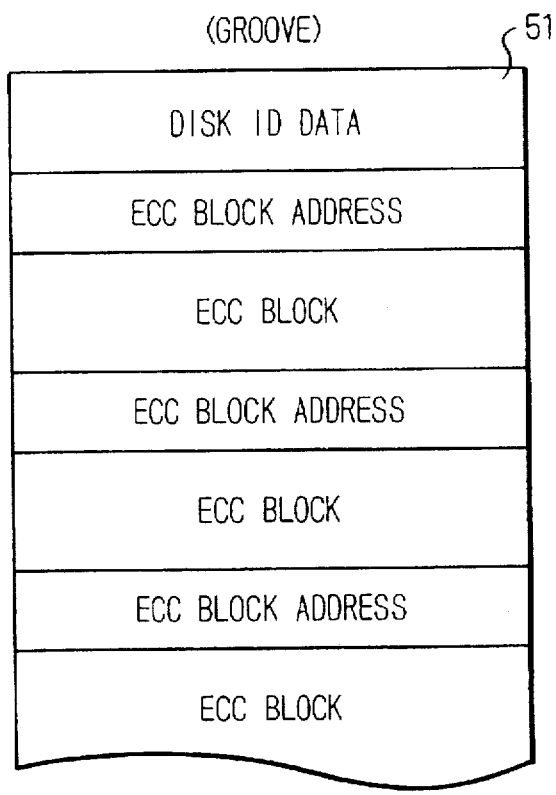
F I G. 5
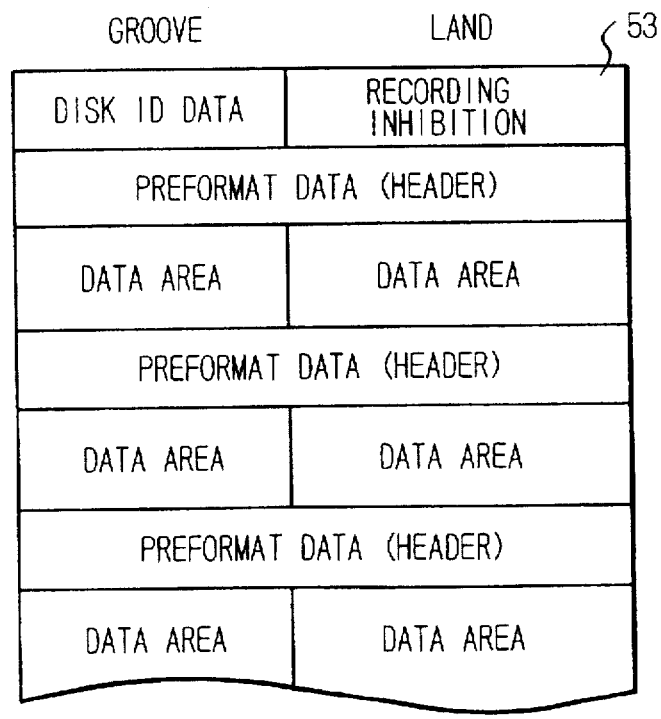
F I G. 7

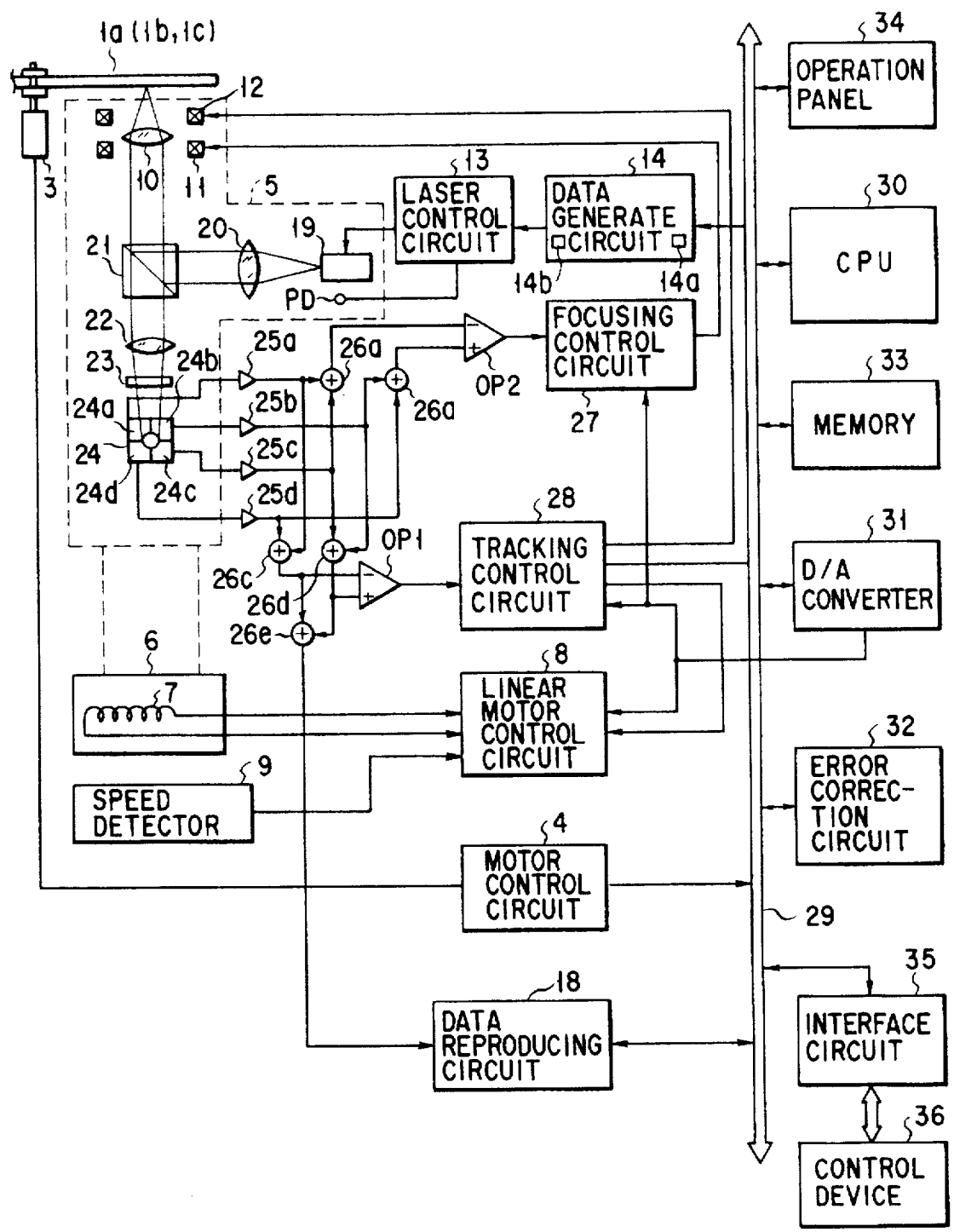
F I G. 10

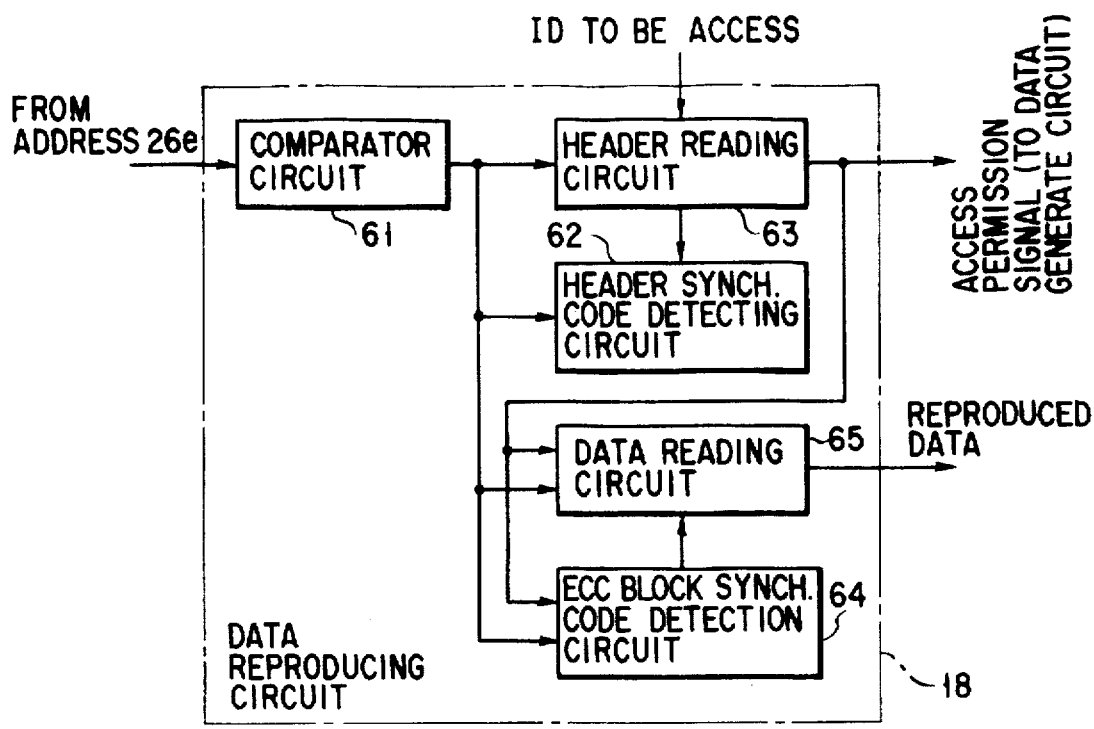
F I G. 11
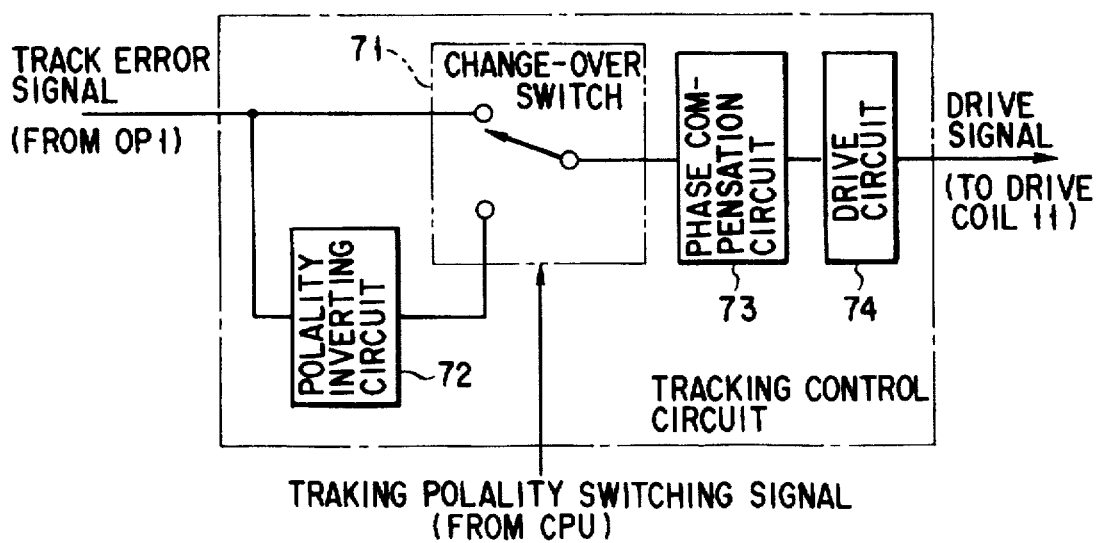
F I G. 12

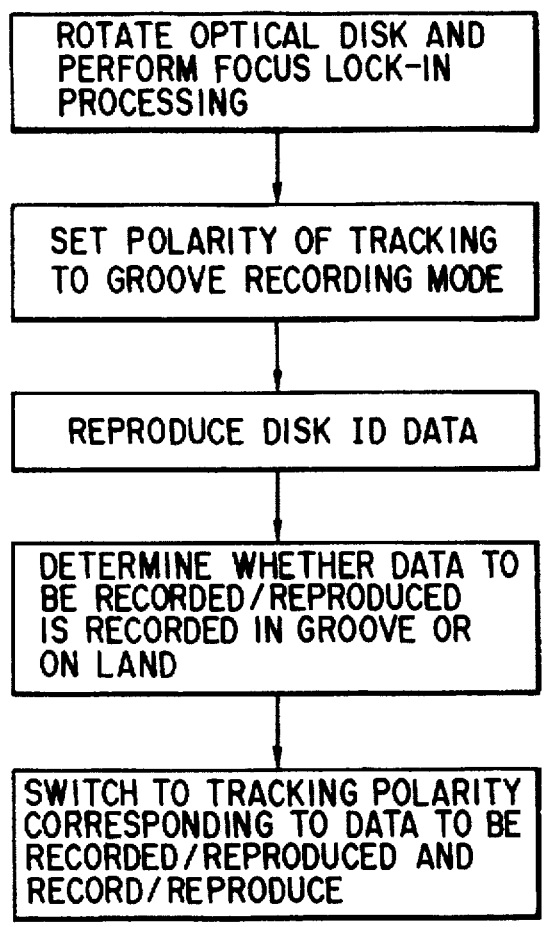
F I G. 13

_5,761,189_

APPARATUS FOR MANUFACTURING A MASER DISK, OPTICAL DISK FORMING APPARATUS, AND OPTICAL DISK FORMING METHOD

BACKGROUND OF THE INVENTION

1. Field of the Invention

The present invention relates to a master manufacturing apparatus for an optical disk, an optical disk forming apparatus, and an optical disk forming method which are used to form a rewritable optical disk on or from which data is recorded or reproduced by using both a concentrical or spiral groove and a land, and on which address data are recorded at predetermined intervals in a mastering process using record marks, and a read only optical disk on which data is recorded in a mastering process using record marks recorded in a concentrical or spiral form as recording tracks.

2. Description of the Related Art

Conventional optical disks include an optical disk on which data is recorded in only a guide groove (groove) or from which the data in the groove is reproduced, and an optical disk (CD-ROM) on which data is recorded by forming record marks representing data in a virtual guide groove in advance in an optical disk mastering process. Tracking is performed for such an optical disk by using a track error signal (tracking detection output) obtained from a guide groove (groove) or a record mark. In this operation, data is recorded or reproduced.

Recently, another optical disk has been proposed (Jpn. Pat. Appln. KOKOKU Publication No. 63-57895). In this optical disk, data is recorded in or reproduced from both guide grooves (grooves) and on flat portions (lands) between the guide grooves.

None of the conventional apparatuses which have been developed, however, can handle the above optical disks alone.

Demands have therefore arisen for an apparatus which can handle both a rewritable optical disk on/from which data is recorded/reproduced by using both a groove and a land, and a read only optical disk on which data is recorded by using record marks recorded in a mastering process, and can correctly and quickly identify each optical disk.

SUMMARY OF THE INVENTION

It is an object of the present invention to provide an apparatus which can handle both a rewritable optical disk on/from which data is recorded/reproduced by using both a groove and a land, and on which address data are recorded at predetermined intervals in a mastering process using record marks, and a read only optical disk on which data is recorded by using record marks recorded in a mastering process, and can correctly and quickly identify each optical disk.

To achieve the above object, the present invention provides an apparatus for manufacturing a master disk having lands and grooves arranged in concentric circles or a spiral and adapted to form a rewritable optical disk on/from which data is recorded/reproduced by using the lands and grooves and on which address data is recorded in advance in the form of record marks arranged at predetermined intervals, and to form, in a mastering process, a read only optical disk on which data is recorded in the form of record marks which are arranged in concentric circles or a spiral, the method comprising: first forming means for, in manufacturing a master disk used for a rewritable optical disk, forming pre-pit data corresponding to disk ID data indicating a type of optical disk in an innermost groove of the master disk; and second forming means for, in manufacturing a master disk used for a read only optical disk, forming pre-pit data corresponding to disk ID data indicating a type of optical disk on an innermost peripheral portion of the master.

The present invention also provides an apparatus for manufacturing a master disk having lands and grooves arranged in concentric circles or a spiral and adapted to form a rewritable optical disk on/from which data is recorded/reproduced by using the lands and grooves and on which address data is recorded in advance in the form of record marks arranged at predetermined intervals, and to form, in a mastering process, a read only optical disk on which data is recorded in the form of record marks which are arranged in concentric circles or a spiral, the method comprising: first forming means for, in manufacturing a master disk used for a rewritable optical disk, forming pre-pit data corresponding to disk ID data indicating a type of optical disk in an innermost groove of the master disk; and second forming means for, in manufacturing a master used for a read only optical disk, forming pre-pit data corresponding to disk ID data indicating a type of optical disk on an innermost peripheral portion of the master disk, wherein recording of data on a land corresponding to the groove in which the pre-pit data corresponding to the disk ID data is formed by the first forming means is inhibited.

The present invention also provides an apparatus for manufacturing a master disk having lands and grooves arranged in concentric circles or a spiral and adapted to form a rewritable optical disk on/from which data is recorded/reproduced by using the lands and grooves and on which address data is recorded in advance in the form of record marks arranged at predetermined intervals, and to form, in a mastering process, a read only optical disk on which data denotes a read only optical disk format is recorded in the form of record marks which are arranged in concentric circles or a spiral, the method comprising: first forming means for, in manufacturing a master disk used for a rewritable optical disk, for forming pre-pit data corresponding to disk ID data indicating a type of optical disk in an innermost groove of the master disk according to the same format as the read only optical disk format; and second forming means for, in manufacturing a master disk used for a read only optical disk, forming pre-pit data corresponding to disk ID data indicating a type of optical disk on an innermost peripheral portion of the master disk according to the read only optical disk format.

The present invention also provides an apparatus for manufacturing a master disk having lands and grooves arranged in concentric circles or a spiral and adapted to form a rewritable optical disk on/from which data is recorded/reproduced by using the lands and grooves and on which address data is recorded in advance in the form of record marks arranged at predetermined intervals, and to form, in a mastering process, a read only optical disk on which data denotes a read only optical disk format is recorded in the form of record marks which are arranged in concentric circles or a spiral, the method comprising: first forming means for, in manufacturing a master disk used for a rewritable optical disk, for forming pre-pit data corresponding to disk ID data indicating a type of optical disk in an innermost groove of the master disk according to the same format as the read only optical disk format; and second forming means for, in manufacturing a master disk used for a read only optical disk, forming pre-pit data corresponding to disk ID data indicating a type of optical disk on an innermost peripheral portion of the master disk according to the read only optical disk format, wherein recording of data on a land corresponding to the groove in which the pre-pit data corresponding to the disk ID data is formed by the first forming means is inhibited.

The present invention also provides an optical disk forming apparatus comprising first manufacturing means for manufacturing a master disk for a rewritable optical disk by forming pre-pit data corresponding to disk ID data indicating a type of optical disk in an innermost groove of the master disk used to manufacture a rewritable optical disk on/from which data is recorded/reproduced by using both a concentrical or spiral groove and a land, and forming pre-pit data constituted by synch. codes and address data at predetermined intervals; first forming means for forming a stamper for a rewritable optical disk by using the master disk manufactured by the first manufacturing means; second forming means for forming a rewritable optical disk by using the stamper formed by the first forming means; second manufacturing means for manufacturing a master disk for a read only optical disk by forming pre-pit data corresponding to disk ID data indicating a type of optical disk on an innermost peripheral portion of the master disk used to form a read only optical disk on which data is recorded by recording record marks in a concentrical or spiral form as a recording track in a mastering process, and forming pre-pit data corresponding to record data in a corresponding area; third forming means for forming a stamper for a read only optical disk by using the master disk manufactured by the second manufacturing means; and fourth forming means for forming a read only optical disk by using the stamper formed by the third forming means.

The present invention also provides an optical disk forming method comprising the steps of: manufacturing a master disk for a rewritable optical disk by forming pre-pit data corresponding to disk ID data indicating a type of optical disk in an innermost groove of the master disk used to manufacture a rewritable optical disk on/from which data is recorded/reproduced by using both a concentrical or spiral groove and a land, and forming pre-pit data constituted by synch. codes and address data at predetermined intervals; forming a stamper for a rewritable optical disk by using the manufactured master disk; forming a rewritable optical disk by using the formed stamper; manufacturing a master disk for a read only optical disk by forming pre-pit data corresponding to disk ID data indicating a type of optical disk on an innermost peripheral portion of the master disk used to form a read only optical disk on which data is recorded by recording record marks in a concentrical or spiral form as a recording track in a mastering process, and forming pre-pit data corresponding to record data in a corresponding area; forming a stamper for a read only optical disk by using the manufactured master disk; and forming a read only optical disk by using the formed stamper formed.

The present invention also provides an optical disk forming apparatus comprising: first manufacturing means for manufacturing a master disk for a rewritable optical disk by forming pre-pit data corresponding to disk ID data indicating a type of optical disk in an innermost groove of the master disk used to manufacture a rewritable optical disk on/from which data is recorded/reproduced by using both a concentrical or spiral groove and a land, and forming pre-pit data constituted by synch. codes and address data on boundaries between the grooves and lands at predetermined intervals; first forming means for forming a stamper for a rewritable optical disk by using the master disk manufactured by the first manufacturing means; second forming means for forming a rewritable optical disk by using the stamper formed by the first forming means; second manufacturing means for manufacturing a master disk for a read only optical disk by forming pre-pit data corresponding to disk ID data indicating a type of optical disk on an innermost peripheral portion of the master disk used to form a read only optical disk on which data is recorded by recording record marks in a concentrical or spiral form as a recording track in a mastering process, and forming pre-pit data corresponding to record data in a corresponding area; third forming means for forming a stamper for a read only optical disk by using the master disk manufactured by the second manufacturing means; and fourth forming means for forming a read only optical disk by using the stamper formed by the third forming means.

The present invention also provides an optical disk forming method comprising the steps of: manufacturing a master disk for a rewritable optical disk by forming pre-pit data corresponding to disk ID data indicating a type of optical disk in an innermost groove of the master disk used to manufacture a rewritable optical disk on/from which data is recorded/reproduced by using both a concentrical or spiral groove and a land, and forming pre-pit data constituted by synch. codes and address data on boundaries between the grooves and lands at predetermined intervals; forming a stamper for a rewritable optical disk by using the manufactured master disk; forming a rewritable optical disk by using the formed stamper; manufacturing a master disk for a read only optical disk by forming pre-pit data corresponding to disk ID data indicating a type of optical disk on an innermost peripheral portion of the master disk used to form a read only optical disk on which data is recorded by recording record marks in a concentrical or spiral form as a recording track in a mastering process, and forming pre-pit data corresponding to record data in a corresponding area; forming a stamper for a read only optical disk by using the manufactured master disk; and forming a read only optical disk by using the formed stamper formed.

The present invention also provides an optical disk on/from which data is recorded/reproduced by using both a concentrical or spiral groove and a land, wherein disk ID data indicating a type of optical disk is recorded on an innermost land, and an innermost groove is set in a non-recorded state.

The present invention also provides an optical disk apparatus comprising an optical disk apparatus for recording/reproducing data on/from an optical disk having a concentrical or spiral groove and a land by using both the groove and the land, wherein disk ID data indicating a type of optical disk is recorded on an innermost land of the optical disk, and an innermost groove of the optical disk is set in a non-recorded state.

The present invention also provides an optical disk forming apparatus for forming a rewritable optical disk on/from which data is recorded/reproduced by using both a concentrical or spiral groove and a land, and on which address data is recorded in advance by forming record marks at predetermined intervals, and a read only optical disk on which data is recorded by recording record marks in a concentrical or spiral form as a recording track in a mastering process, wherein in forming the rewritable optical disk, pre-pit data corresponding to disk ID data indicating a type of optical disk is formed in an innermost groove according to the same format as a rewritable disk format.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a block diagram showing the schematic arrangement of a cutting apparatus to explain an embodiment of the present invention;

FIG. 3 is a view for explaining ECC block format data to which data to which ECC block synch. codes are added;

FIG. 5 is a view showing an example of how data is recorded on a read only optical disk;

FIG. 7 is a view showing an example of how data is recorded on a rewritable optical disk on which data is recorded in grooves and on lands;

FIG. 10 is a block diagram showing the schematic arrangement of an optical disk apparatus;

FIG. 11 is a block diagram showing the schematic arrangement of a data reproducing circuit;

FIG. 12 is a block diagram showing the schematic arrangement of a tracking control circuit; and FIG. 13 is a flow chart for explaining an operation.

DETAILED DESCRIPTION OF THE PREFERRED EMBODIMENT

Figure 2:
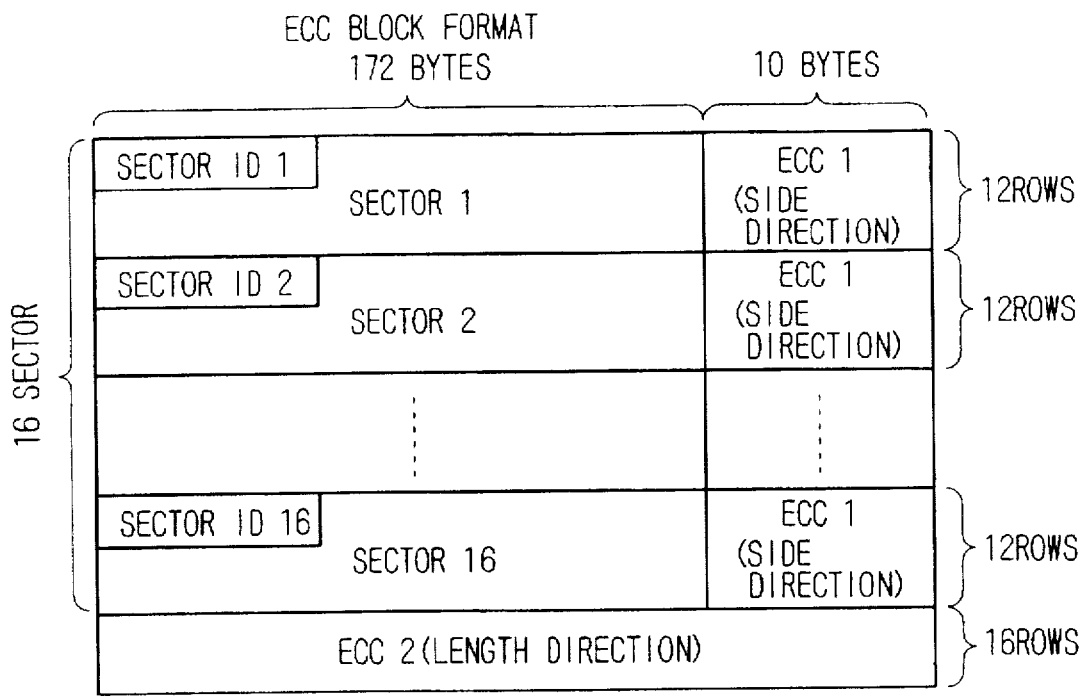
FIG. 2 is a view for explaining ECC block format data.

An embodiment of the present invention will be described below with reference to the accompanying drawings.

FIG. 1 shows a cutting apparatus for forming a glass master (mastering process) in forming a stamper. Referring to FIG. 1, in forming a glass master for a read only optical disk (CD-ROM), the cutting apparatus forms minute concave record marks (pits) on a glass substrate 1a having no uneven portions by melting a photoresist on the substrate upon ON/OFF control of laser power.

In forming a glass master for a rewritable optical disk (RAM), the cutting apparatus forms minute concave record marks (pits) on a glass substrate 1b having uneven portions as recording tracks by melting a photoresist on the substrate upon ON/OFF control of laser power in accordance with the concave portions (grooves) of the tracks.

Furthermore, in forming a glass master for a rewritable optical disk (RAM), the cutting apparatus forms minute concave record marks (pits) on a glass substrate 1c having uneven portions as recording tracks by melting a photoresist on the substrate upon ON/OFF control of laser power in accordance with the concave portions (grooves) and convex portions (lands) of the tracks.

Referring to FIG. 1, the glass substrate 1a (1b, 1c) coated with a photoresist is rotated at, e.g., a constant speed by a motor 3. This motor 3 is controlled by a motor control circuit 4.

A cutting process for the glass substrate 1a (1b, 1c) is performed by an optical head 5. The optical head 5 is fixed to a drive coil 7 constituting the movable portion of a linear motor 6. The drive coil 7 is connected to a linear motor control circuit 8.

A speed detector 9 is connected to the linear motor control circuit 8. A speed signal from the speed detector 9 is sent to the linear motor control circuit 8.

A permanent magnet (not shown) is mounted on the stationary portion of the linear motor 6. When the drive coil 7 is excited by the linear motor control circuit 8, the optical head 5 is moved in the radial direction of the glass substrate 1a (1b, 1c).

An objective lens 10 is held on the optical head 5 with a wire or leaf spring (not shown). The objective lens 10 is moved in the focusing direction (along the optical axis of the lens) by a drive coil 12, and is moved in the tracking direction (perpendicular to the optical axis of the lens) by a drive coil 11.

A laser beam emitted from a semiconductor laser oscillator (argon neon laser oscillator) 19 driven by a laser control circuit 13 is irradiated on the glass substrate 1a (1b, 1c) via a collimator lens 20, a half prism 21, and the objective lens 10. The light reflected by the glass substrate 1a is guided to a photodetector 24 via the objective lens 10, the half prism 21, a condenser lens 22, and a cylindrical lens 23.

The photodetector 24 is constituted by four divided photodetection cells 24a, 24b, 24c, and 24d.

An output signal from the photodetection cell 24a of the photodetector 24 is supplied to one input terminal of each of adders 26a and 26d via an amplifier 25a. An output signal from the photodetection cell 24b is supplied to one input terminal of each of adders 26b and 26c via an amplifier 25b. An output signal from the photodetection cell 24c is supplied to the other input terminal of each of the adders 26a and 26c via an amplifier 25c. An output signal from the photodetection cell 24d is supplied to the other input terminal of each of the adders 26b and 26d via an amplifier 25d.

An output signal from the adder 26a is supplied to the inverting input terminal of a differential amplifier OP2. An output signal from the adder 26b is supplied to the noninverting input terminal of the differential amplifier OP2. With this operation, the differential amplifier OP2 supplies a signal associated with a focal point to a focusing control circuit 27 in accordance with the difference between the signals from the adders 26a and 26b. An output signal from the focusing control circuit 27 is supplied to the focusing drive coil 12. As a result, the laser beam is controlled to be always set in a just focus state on the glass substrate 1a (1b, 1c).

An output signal from the adder 26d is supplied to the inverting input terminal of a differential amplifier OP1. An output signal from the adder 26c is supplied to the noninverting input terminal of the differential amplifier OP1. With this operation, the differential amplifier OP1 supplies a track error signal to a tracking control circuit 28 in accordance with the difference between the output signals from the adders 26d and 26c. The tracking control circuit 28 forms a track drive signal in accordance with the track error signal supplied from the differential amplifier OP1. Note that a track drive signal for the glass substrate 1a is formed in accordance with a control signal supplied from a CPU 30.

The track drive signal output from the tracking control circuit 28 is supplied to the tracking drive coil 11. The track error signal used by the tracking control circuit 28 is supplied to the linear motor control circuit 8.

When the track drive signal is supplied to the drive coil 11, the objective lens 10 gradually moves from one groove (record mark string) to another by a distance corresponding to one track while the glass substrate 1b (1a) rotates once, or the objective lens 10 gradually moves from a groove to a groove or from a land to a land by a distance corresponding to one track while the glass substrate 1c rotates once.

While the objective lens 10 is moved by the tracking control circuit 28, the linear motor control circuit 8 moves the linear motor 6, i.e., the optical head 5, such that the objective lens 10 is located near the central position of the optical head 5.

A data generate circuit 14 is arranged on the input side of the laser control circuit 13. The data generate circuit 14 includes an ECC (error correcting code) block data generate circuit 14a for converting ECC block format data as record data like the one shown in FIG. 2, which is supplied from an error correction circuit 32, into ECC block format data having ECC block synch. codes, as shown in FIG. 3, and a modulation circuit 14b for converting (modulating) the record data from the ECC block data generate circuit 14a according to the 8-15 code conversion scheme or the like.

As shown in FIG. 3, each ECC block synch. code has a 2-byte configuration, i.e., "0100000000000000 0100xxxxxxx00100" and is obtained by converting "175, 240" into an 8-15 code. This ECC block synch. code is different from a synch. code for ID detection.

The ECC block format data in FIG. 3 represents a format actually recorded on an optical disk. Each sector of the ECC block format data in FIG. 2 has a 182 byte×12 row configuration and consists of record data, a sector ID, and an ECC for the side direction. In contrast to this, in the ECC block format data in FIG. 3, 2-byte synch. codes are added in units of 91 bytes, and a 2-byte synch. code is added to an ECC for the length direction for each 91 byte×12 row unit.

Record data to which error correcting codes (ECCs) are added by the error correction circuit 32 is supplied to the data generate circuit 14. Record data from a control device 46 as an external device is supplied to the error correction circuit 32 via an interface circuit 45 and a bus 20.

The error correction circuit 32 adds error correcting codes (ECCs 1 and 2) for the width and length directions and a sector ID to each 4 Kbyte sector of 32 Kbyte record data supplied from the control device 46 to form ECC block format data like the one shown in FIG. 2.

This cutting apparatus has a D/A converter 31 used to exchange data between the focusing control circuit 27, the tracking control circuit 28, the linear motor control circuit 8, and the CPU 30.

The laser control circuit 13, the focusing control circuit 27, the tracking control circuit 28, the linear motor control circuit 8, the motor control circuit 4, the data generate circuit 14, and the like are controlled by the CPU 30 via a bus line 29. The CPU 30 performs predetermined operations in accordance with a cutting start command from an operation panel 34 and programs stored in a memory 33.

After the above cutting apparatus completes a cutting process by melting the photoresist on the glass substrate 1a in accordance with record data for the entire surface of the substrate, developing and conducting processes are performed, thereby forming a glass master. A stamper consisting of nickel or the like is formed by electroplating or the like using this glass master.

A read only optical disk 51 is formed by injection molding or the like using this stamper.

After the cutting apparatus completes a cutting process by melting the photoresist on the glass substrate 1b in accordance with record data for the entire surface of the substrate, developing and conducting processes are performed, thereby forming a glass master. A stamper consisting of nickel or the like is formed by electroplating or the like using this glass master.

A rewritable optical disk (RAM) 52 having data recorded in only its grooves is formed by injection molding or the like using this stamper.

After the cutting apparatus completes a cutting process by melting the photoresist on the glass substrate 1c in accordance with record data for the entire surface of the substrate, developing and conducting processes are performed, thereby forming a glass master. A stamper consisting of nickel or the like is formed by electroplating or the like using this glass master.

A rewritable optical disk (RAM) 53 having data recorded in/on its grooves and lands is formed by injection molding or the like using this stamper.

Figure 4A:
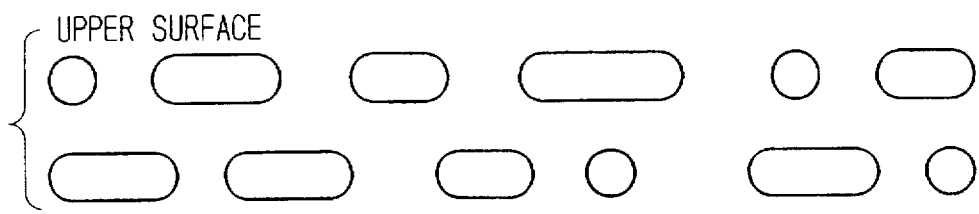
FIGS. 4A and 4B are views showing an example of how record marks (pits) are recorded on a read only optical disk.
Figure 4B:
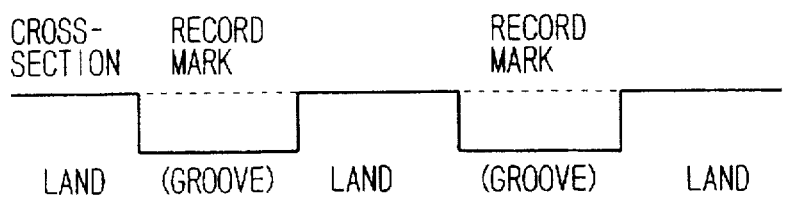

As shown in FIGS. 4A and 4B, minute concave record marks (pits) corresponding to data are formed on the read only optical disk 51. The pit portions as record marks correspond to grooves, and the remaining portions correspond to lands. In the read only optical disk 51, as shown in FIG. 5, data is recorded in the above ECC block data unit (e.g., 38,688 bytes), and disk ID data is recorded as innermost ECC block data. This disk ID data includes data used to determine whether the disk is designed to record data in only grooves or both in grooves and on lands, data used to determine whether addresses on/from which data are to be recorded/reproduced are present on lands or in grooves, and the like.

Figure 6:
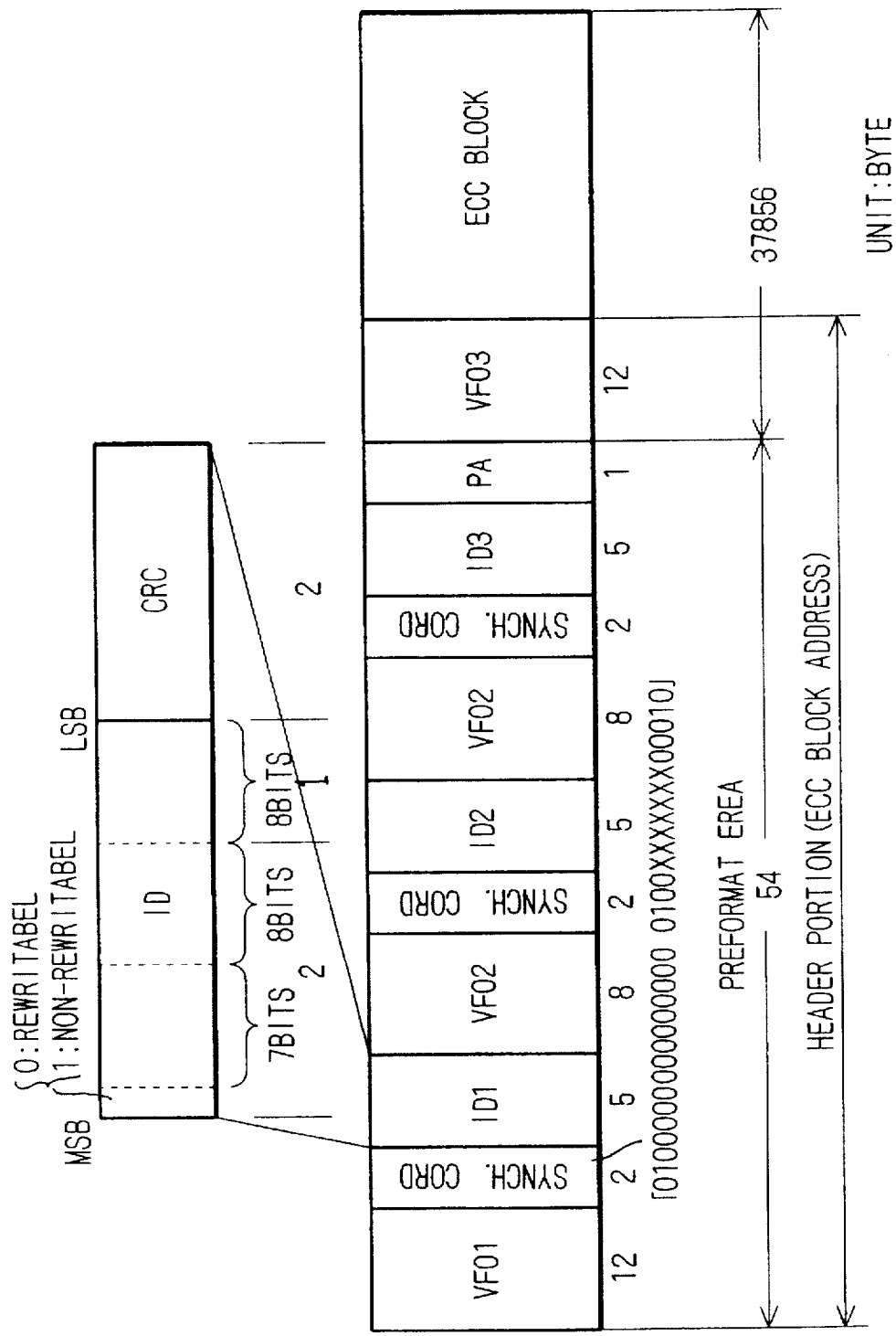
FIG. 6 is a view showing the format of ECC block address data (header portion)

ECC block address data (e.g., 66 bytes) is added to each ECC block data. As shown in FIG. 6, each ECC block address data is constituted by the following areas: a 12-byte synch. code portion VFO1, two 8-byte synch. code portions VFO2, a 12-byte synch. code portion VFO3, three 2-byte synch. codes for ID detection, three 5-byte address portion IDs, and a 1-byte postamble PA.

A consecutive data pattern (synch. code) for PLL locking is recorded in the synch. code portion VFO. A synch. code for ID detection is "0100000000000000 0100xxxxxxx00010", which is obtained by converting "119, 125, 128, 132, 138, 144, 152, 158, 164, 167, 171" into an 8-15 code. This synch. code for ID detection is different from a synch. code in ECC block data. In each address ID area, an ID such as an ECC block number consisting of 23 bits is recorded, together with the most significant bit (MSB) as a flag representing whether the corresponding ECC block can be rewritten, and a 2-byte error correcting code (CRC: Cyclic Redundancy Check). When the ECC block can be rewritten, "0" is recorded in the most significant bit (MSB). Otherwise, "1" is recorded in the most significant bit (MSB). The postamble PA is used when the error correcting code for the address portion ID exceeds 2 bytes.

Figure 8:
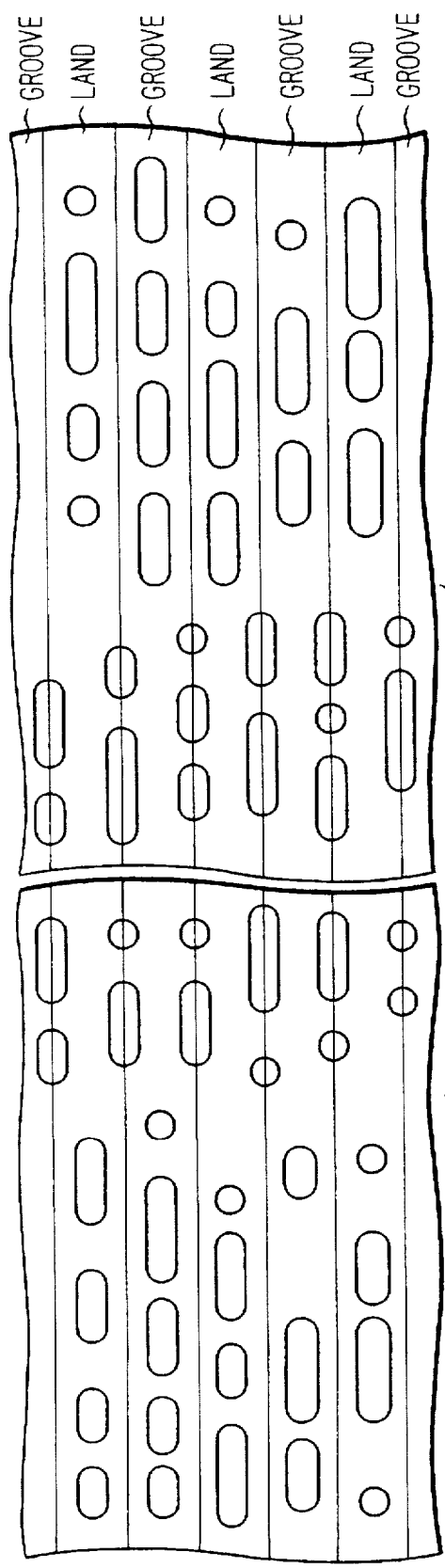
FIG. 8 is a view for explaining the preformat data of a header portion.
Figure 9A:
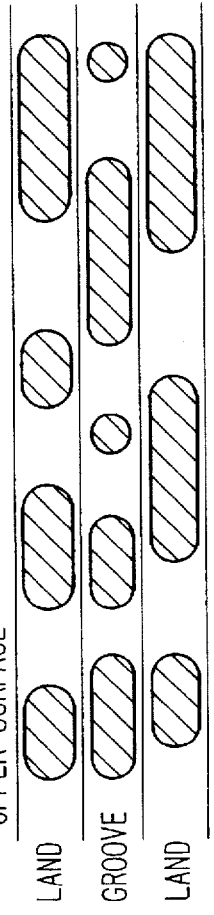
FIGS. 9A and 9B are views showing an example of how record marks are recorded on a rewritable optical disk on which data is recorded on grooves and lands.
Figure 9B:
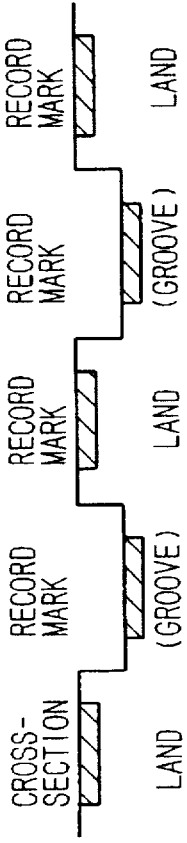

As shown in FIG. 7, disk ID data as ECC block data is recorded in the innermost groove of the rewritable optical disk (RAM) 53, and recording of data on the land corresponding to this innermost ECC block data is inhibited. Subsequently, as shown in FIG. 8, the preformat data (e.g., 54 bytes) of a header portion is formed on the boundary between a groove and a land for each ECC block data record area (e.g., 38,688+12 bytes). On the remaining portions, record data as record marks are recorded in the grooves and on the lands, as shown in FIGS. 9A and 9B.

This disk ID data includes data used to determine whether the disk is designed to record data in only grooves or both in grooves and on lands, data used to determine whether addresses on/from which data are to be recorded/reproduced are present on lands or in grooves, and the like.

The header portion corresponds to the above ECC block address data (see FIG. 6). However, a synch. code is recorded in the 12-byte synch. code portion VFO3 before recording of ECC block data, and PLL correction is performed by using the recorded synch. code in the reproduction mode.

The rewritable optical disk (RAM) 52 is designed to record disk ID data as ECC block data in the innermost groove. Subsequently, as shown in FIG. 8, the preformat data (e.g., 54 bytes) of a header portion is formed in a groove for each ECC block data record area (e.g., 38,688+12 bytes).

This disk ID data includes data used to determine whether the disk is designed to record data in only grooves or both in grooves and on lands, data used to determine whether addresses on/from which data are to be recorded/reproduced are present on lands or in grooves, and the like.

The header portion corresponds to the above ECC block address data (see FIG. 6). However, a synch. code is recorded in the 12-byte synch. code portion VFO3 before recording of ECC block data, and PLL correction is performed by using the recorded synch. code in the reproduction mode.

An optical disk apparatus for reproducing data from the read only optical disk (CD-ROM) 51, recording data on the rewritable optical disks 52 and 53, or reproducing recorded data from the optical disks 52 and 53 will be described next with reference to FIG. 10. Since the arrangement of this apparatus is almost the same as that of the cutting apparatus, the same reference numerals denotes the same parts, and a description thereof will be omitted.

The sum signal of outputs from photodetection cells 24a to 24d of a photodetector 24, i.e., an output signal from an adder 26e, in a state wherein focusing and tracking are performed, reflects changes in the reflectance of pits (record data) formed in grooves and lands of tracks. This signal is supplied to a data reproducing circuit 18. This data reproducing circuit 18 outputs an access permission signal with respect to an ECC block with a target ID for recording, or outputs reproduced data with respect to an ECC block with a target ID for reproduction.

The data reproduced by the data reproducing circuit 18 is subjected to error correction using error correcting codes (ECCs) added by an error correction circuit 32. The resultant data is output to an optical disk control device 36 as an external device via an interface circuit 35.

As shown in FIG. 11, the data reproducing circuit 18 comprises a comparator circuit 61, a header synch. code detection circuit 62, a header reading circuit 63, an ECC block synch. code detection circuit 64, and a data reading circuit 65.

The comparator circuit 61 compares a reference signal with the sum signal of the outputs from the photodetection cells 24a to 24d of the photodetector 24, i.e., the changes in the reflectance of the bits formed in the grooves and lands of the tracks, thereby performing binarization. The comparator circuit 61 is constituted by a comparator and the like. The binary signal obtained by the comparator circuit 61 is supplied to the header synch. code detection circuit 62, the header reading circuit 63, the ECC block synch. code detection circuit 64, and the data reading circuit 65.

The header synch. code detection circuit 62 detects the ID detection synch. codes "0100000000000000 0100xxxxxxx00010" of the header of the binary signal (binary data) corresponding to a predetermined number of bits. The header synch. code detection circuit 62 is constituted by a register for storing the binary data, a register for storing the ID detection synch. codes of the header, and a comparator for comparing the data in these registers. The detection signal from the header synch. code detection circuit 62 is supplied to the header reading circuit 63.

The header reading circuit 63 reads the address portion ID of the binary data from the comparator circuit 61 in accordance with the detection signal from the header synch. code detection circuit 62. If this address portion ID coincides with the ID (to be accessed) supplied from the optical disk control device 36 as an external device, the header reading circuit 63 outputs an access permission signal. The header reading circuit 63 is constituted by a register for storing the binary data as the address portion ID from the comparator circuit 61, a register for storing the ID (to be accessed) supplied from the external device, and a comparator for comparing the data in these registers. The access permission signal from the header reading circuit 63 is supplied to the ECC block synch. code detection circuit 64, the data reading circuit 65, and the data generate circuit 14.

Upon reception of the access permission signal from the header reading circuit 63, the ECC block synch. code detection circuit 64 detects the ECC block synch. codes "0100000000000000 0100xxxxxxx00100" of the binary data, supplied from the comparator circuit 61, by the number corresponding to the number of bytes of the ECC block. The ECC block synch. code detection circuit 64 is constituted by a register for storing the binary data, a register for storing the binary data, a register for storing the ECC block synch. codes, and a comparator for comparing the data in these registers. The detection signal from the ECC block synch. code detection circuit 64 is supplied to the data reading circuit 65.

Upon reception of the access permission signal from the header reading circuit 63, the data reading circuit 65 reads 91-byte binary data as reproduced data which is supplied from the comparator circuit 61 afterward. The data reading circuit 65 is constituted by, e.g., a demodulation circuit, a binarization circuit, and the like. The demodulation circuit demodulates the binary data supplied from the comparator circuit 61 by inverse transformation of the 8-15 code. The binarization circuit binarizes the demodulated data in units of bytes. The resultant reproduced data is supplied to the error correction circuit 32.

A laser control circuit 13 changes the intensity of a laser beam in accordance with a target optical disk.

The data generate circuit 14 outputs record data to the laser control circuit 13 in the data recording mode in accordance with an access permission signal from the header reading circuit 63.

As shown in FIG. 12, a tracking control circuit 28 comprises a change-over switch 71, a polarity inverting circuit 72, a phase compensation circuit 73, and a drive circuit 74.

The change-over switch 71 is operated in accordance with a tracking polarity switching signal from a CPU 30. When the polarity of the tracking polarity switching signal indicates a groove, the change-over switch 71 outputs a track error signal from a differential amplifier OP1 to the phase compensation circuit 73. When the polarity of the tracking polarity switching signal indicates a land, the change-over switch 71 outputs a track error signal whose polarity is inverted by the polarity inverting circuit 72 to the phase compensation circuit 73.

The phase compensation circuit 73 inverts the polarity (phase) of the track error signal supplied from the differential amplifier OP1. The output from the phase compensation circuit 73 is supplied to the polarity inverting circuit 72.

The phase compensation circuit 73 compensates the phase of the track error signal having positive polarity (positive phase) or opposite or negative polarity (opposite phase), which is supplied from the change-over switch 71, and outputs the resultant signal to the drive circuit 74.

The drive circuit 74 drives a drive coil 11 in accordance with the track drive signal from the phase compensation circuit 73 to move an objective lens 10 in the tracking direction.

Processing to be performed in the above arrangement when one of optical disks 51, 52, and 53 is loaded will be described next with reference to the flow chart in FIG. 13.

When the optical disk 51 (52, 53) is loaded by a loading mechanism (not shown), the CPU 30 causes the motor control circuit 4 to drive/control the motor 3 so as to rotate the optical disk at a predetermined rotational speed.

An optical head 5 is then moved to a position as an initial position opposing the innermost peripheral portion of the optical disk 51 (52, 53), and focus lock-in is performed. More specifically, the CPU 30 causes the laser control circuit 13 to output a reproduction control signal. As a result, the laser control circuit 13 irradiates a reproduction laser beam from the semiconductor laser oscillator 19 in the optical head 5 onto the optical disk via the objective lens 10. The laser beam reflected by the optical disk 51 (52, 53) is guided to the photodetector 24 via the objective lens 10, a half prism 21, a condenser lens 22, and a cylindrical lens 23. A differential amplifier OP2 then obtains a focusing signal on the basis of the difference between the sum signal of outputs from the photodetection cells 24a and 24c of the photodetector 24 and the sum signal of outputs from the photodetection cells 24b and 24d of the photodetector 24, and outputs it to a focusing control circuit 27. With this operation, the focusing control circuit 27 excites a drive coil 12 in accordance with the supplied focusing signal to move the objective lens 10, thereby focusing the laser beam irradiated onto the optical disk 51 (52, 53).

While this focus lock-in is performed, the differential amplifier OP1 outputs the difference between the sum signal of the outputs from the photodetection cells 24a and 24d and the sum signal of the outputs from the photodetection cells of the photodetector 24, as a track error signal, to the tracking control circuit 28. In this case, since a tracking polarity switching signal corresponding to a groove has been supplied from the CPU 30 to the tracking control circuit 28, the track error signal from the differential amplifier OP1 is output to the phase compensation circuit 73 via the change-over switch 71. The phase compensation circuit 73 performs phase compensation of the supplied track error signal, and outputs the resultant signal as a drive signal to the drive circuit 74.

The drive circuit 74 drives the objective lens 10 through the drive coil 11 in accordance with the supplied drive signal to perform tracking correction for fine movement of the laser beam irradiated on the optical disk 51 (52, 53) via the objective lens 10.

The optical head 5 therefore irradiates the laser beam onto the innermost peripheral portion of the optical disk 51 (52, 53).

In this state, a read signal corresponding to the data on the innermost track is binarized by the comparator circuit 61 in the data reproducing circuit 18, and the binary data is supplied to the header synch. code detection circuit 62, the header reading circuit 63, the ECC block synch. code detection circuit 64, and the data reading circuit 65.

When a header synch. code is detected by the header synch. code detection circuit 62, the header reading circuit 63 reads an address portion ID of the binary data from the comparator circuit 61. If this address portion ID coincides with the address ID of disk ID data (to be accessed) supplied from the optical disk control device 36 as an external device, an access permission signal is output to the ECC block synch. code detection circuit 64 and the data reading circuit 65.

Every time an ECC block synch. code is detected by the ECC block synch. code detection circuit 64, the data reading circuit 65 demodulates 91-byte data, which is subsequently supplied from the comparator circuit 61, by inverse transformation of an 8-15 code using the demodulation circuit, and binarizes the data using the binarization circuit. The resultant data is output as reproduced data to the error correction circuit 32.

In handling the optical disk 51, every time an ECC block synch. code is detected by the ECC block synch. code detection circuit 64, the data reading circuit 65 may read subsequent 91-byte data as reproduced data without using the header synch. code detection circuit 62 and the header reading circuit 63. In this case, no ECC block address is required.

The error correction circuit 32 performs error correction by using error correcting codes (ECCs) added to the supplied reproduced data, and outputs the resultant data to the optical disk control device 36 as an external device via the interface circuit 35.

As a result, disk ID data is supplied to the optical disk control device 36.

The optical disk control device 36 discriminates, on the basis of the supplied disk ID data, whether the loaded optical disk is the read only optical disk 51, the rewritable optical disk (RAM) 52 designed to record data in only grooves, or the rewritable optical disk (RAM) 53 designed to record data in grooves and on lands. Upon discriminating that the optical disk is the optical disk 53, the optical disk control device 36 discriminates whether the access position is at a groove or land, and outputs these discrimination results and the address ID, at which recording or reproduction (access) is to be performed, to the CPU 30.

The CPU 30 changes the tracking polarity switching signal to be output to the tracking control circuit 28 into a signal corresponding to a land only when receiving the discrimination result indicating that the access position is at a land. With this operation, the change-over switch 71 is switched, and the track error signal from the differential amplifier OP1 is inverted by the polarity inverting circuit 72 and output to the phase compensation circuit 73. As a result, the tracking control circuit 28 performs tracking correction for fine movement of the laser beam in accordance with the polarity (opposite phase) corresponding to a land.

While the above tracking operation is performed, a data recording/reproducing operation is performed.

As described above, disk ID data associated with the characteristics of optical disks are recorded beforehand on the innermost peripheral portions of a rewritable disk on/from which data is recorded/reproduced by using both a groove and a land and a read only optical disk.

The apparatus can therefore handle both a rewritable optical disk on/from which data is recorded/reproduced by using both a groove and a land, and on which address data are recorded at predetermined intervals in a mastering process using record marks, and a read only optical disk on which data is recorded by using record marks recorded in a mastering process, and can correctly and quickly identify each optical disk.

In addition, when disk ID data is to be recorded on a rewritable optical disk in a mastering process, data is recorded only in grooves to allow normal tracking. In this case, recording of data on a land in an area where disk ID data is recorded in a groove in a mastering process is inhibited.

By this inhibition of recording on the land, a trouble associated with the disk ID data can be avoided.

Furthermore, the disk ID data to be recorded in the mastering process may have the same format as that of ID data on a read only disk (ROM disk), and no address portion need be formed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for manufacturing master disks having lands and grooves arranged in concentric circles or a spiral and adapted to form a rewritable optical disk on/from which data is recorded/reproduced by using the lands and grooves and on which address data is recorded in advance in the form of record marks arranged at predetermined intervals, and to form, in a mastering process, a read only optical disk on which data is recorded in the form of record marks which are arranged in concentric circles or a spiral, said apparatus comprising:

first forming means for, in manufacturing a master disk used for said rewritable optical disk, forming pre-pit data corresponding to disk ID data indicating a type of optical disk in an innermost groove of the master disk used for said rewritable optical disk; and second forming means for, in manufacturing a master disk used for said read only optical disk, forming pre-pit data corresponding to disk ID data indicating a type of optical disk on an innermost peripheral portion of the master disk used for said read only optical disk.

2. An apparatus for manufacturing master disks having lands and grooves arranged in concentric circles or a spiral and adapted to form a rewritable optical disk on/from which data is recorded/reproduced by using the lands and grooves and on which address data is recorded in advance in the form of record marks arranged at predetermined intervals, and to form, in a mastering process, a read only optical disk on which data is recorded in the form of record marks which are arranged in concentric circles or a spiral, said apparatus comprising:

first forming means for, in manufacturing a master disk used for said rewritable optical disk, forming pre-pit data corresponding to disk ID data indicating a type of optical disk in an innermost groove of the master disk used for said rewritable optical disk; and second forming means for, in manufacturing a master disk used for said read only optical disk, forming pre-pit data corresponding to disk ID data indicating a type of optical disk on an innermost peripheral portion of the master disk used for said read only optical disk, wherein recording of data on a land corresponding to the groove in which the pre-pit data corresponding to the disk ID data that is formed by said first forming means is inhibited.

3. An apparatus for manufacturing master disks having lands and grooves arranged in concentric circles or a spiral and adapted to form a rewritable optical disk on/from which data is recorded/reproduced by using the lands and grooves and on which address data is recorded in advance in the for of record marks arranged at predetermined intervals, and to form, in a mastering process, a read only optical disk on which data denoting a read only optical disk format is recorded in the form of record marks which are arranged in concentric circles or a spiral, said apparatus comprising:

first forming means for, in manufacturing a master disk used for said rewritable optical disk, forming pre-pit data corresponding to disk ID data indicating a type of optical disk in an innermost groove of the master disk used for said rewritable optical disk according to the same format as the read only optical disk format; and second forming means for, in manufacturing a master disk used for said read only optical disk, forming pre-pit data corresponding to disk ID data indicating a type of optical disk on an innermost peripheral portion of the master disk used for said read only optical disk according to the read only optical disk format.

4. An apparatus for manufacturing master disks having lands and grooves arranged in concentric circles or a spiral and adapted to form a rewritable optical disk on/from which data is recorded/reproduced by using the lands and grooves and on which address data is recorded in advance in the form of record marks arranged at predetermined intervals, and to form, in a mastering process, a read only optical disk on which data denoting a read only optical disk format is recorded in the form of record marks which are arranged in concentric circles or a spiral, said apparatus comprising:

first forming means for, in manufacturing a master disk used for said rewritable optical disk, forming pre-pit data corresponding to disk ID data indicating a type of optical disk in an innermost groove of the master disk used for said rewritable optical disk according to the same format as the read only optical disk format; and second forming means for, in manufacturing a master disk used for said read only optical disk, forming pre-pit data corresponding to disk ID data indicating a type of optical disk on an innermost peripheral portion of the master disk used for said read only optical disk according to the read only optical disk format, wherein recording of data on a land corresponding to the groove in which the pre-pit data corresponding to the disk ID data that is formed by said first forming means is inhibited.

5. An optical disk forming apparatus comprising:

first manufacturing means for manufacturing a master disk for a rewritable optical disk by forming pre-pit data corresponding to disk ID data indicating a type of optical disk in an innermost groove of the master disk used to manufacture said rewritable optical disk on/from which data is recorded/reproduced by using both a concentrical or spiral groove and a land, and forming pre-pit data constituted by synch. codes and address data at predetermined intervals;

first forming means for forming a stamper for said rewritable optical disk by using the master disk manufactured by said first manufacturing means;

second forming means for forming said rewritable optical disk by using the stamper formed by said first forming means;

second manufacturing means for manufacturing a master disk for a read only optical disk by forming pre-pit data corresponding to disk ID data indicating a type of optical disk on an innermost peripheral portion of the master disk used to form said read only optical disk on which data is recorded by recording record marks in a concentrical or spiral form as a recording track in a mastering process, and forming pre-pit data corresponding to record data in a corresponding area;

third forming means for forming a stamper for said read only optical disk by using the master disk manufactured by said second manufacturing means; and fourth forming means for forming said read only optical disk by using the stamper formed by said third forming means.

6. An optical disk forming method comprising the steps of:

manufacturing a master disk for a rewritable optical disk by forming pre-pit data corresponding to disk ID data indicating a type of optical disk in an innermost groove of the master disk used to manufacture said rewritable optical disk on/from which data is recorded/reproduced by using both a concentrical or spiral groove and a land, and forming pre-pit data constituted by synch. codes and address data at predetermined intervals;

forming a stamper for said rewritable optical disk by using the manufactured master disk for said rewritable optical disk;

forming said rewritable optical disk by using the formed stamper for said rewritable optical disk;

manufacturing a master disk for a read only optical disk by forming pre-pit data corresponding to disk ID data indicating a type of optical disk on an innermost peripheral portion of the master disk used to form said read only optical disk on which data is recorded by recording record marks in a concentrical or spiral form as a recording track in a mastering process, and forming pre-pit data corresponding to record data in a corresponding area;

forming a stamper for said read only optical disk by using the manufactured master disk for said read only optical disk; and forming said read only optical disk by using the formed stamper for said read only optical disk.

7. An optical disk forming apparatus comprising:

first manufacturing means for manufacturing a master disk for a rewritable optical disk by forming pre-pit data corresponding to disk ID data indicating a type of optical disk in an innermost groove of the master disk used to manufacture said rewritable optical disk on/from which data is recorded/reproduced by using both a concentrical or spiral groove and a land, and forming pre-pit data constituted by synch. codes and address data on boundaries between the grooves and lands at predetermined intervals;

first forming means for forming a stamper for said rewritable optical disk by using the master disk manufactured by said first manufacturing means;

second forming means for forming said rewritable optical disk by using the stamper formed by said first forming means;

second manufacturing means for manufacturing a master disk for a read only optical disk by forming pre-pit data corresponding to disk ID data indicating a type of optical disk on an innermost peripheral portion of the master disk used to form said read only optical disk on which data is recorded by recording record marks in a concentrical or spiral form as a recording track in a mastering process, and forming pre-pit data corresponding to record data in a corresponding area;

third forming means for forming a stamper for said read only optical disk by using the master disk manufactured by said second manufacturing means; and fourth forming means for forming said read only optical disk by using the stamper formed by said third forming means.

8. An optical disk forming method comprising the steps of:

manufacturing a master disk for a rewritable optical disk by forming pre-pit data corresponding to disk ID data indicating a type of optical disk in an innermost groove of the master disk used to manufacture said rewritable optical disk on/from which data is recorded/reproduced by using both a concentrical or spiral groove and a land, and forming pre-pit data constituted by synch. codes and address data on boundaries between the grooves and lands at predetermined intervals;

forming a stamper for said rewritable optical disk by using the manufactured master disk for said rewritable optical disk;

forming said rewritable optical disk by using the formed stamper for said rewritable optical disk;

manufacturing a master disk for a read only optical disk by forming pre-pit data corresponding to disk ID data indicating a type of optical disk on an innermost peripheral portion of the master disk used to form said read only optical disk on which data is recorded by recording record marks in a concentrical or spiral form as a recording track in a mastering process, and forming pre-pit data corresponding to record data in a corresponding area;

forming a stamper for said read only optical disk by using the manufactured master disk for said read only optical disk; and forming said read only optical disk by using the formed stamper for said read only optical disk.

\* \* \* \* \*